US008597129B2

(12) United States Patent
Meyer

(10) Patent No.: US 8,597,129 B2
(45) Date of Patent: Dec. 3, 2013

(54) DEVICE FOR A DRIVE CONNECTION

(75) Inventor: Herbert Meyer, Regensburg (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/349,771

(22) Filed: Jan. 13, 2012

(65) Prior Publication Data

US 2013/0045809 A1   Feb. 21, 2013

(30) Foreign Application Priority Data

Jan. 15, 2011   (DE) .......................... 10 2011 008 703

(51) Int. Cl.
*F16F 15/121* (2006.01)
(52) U.S. Cl.
USPC ...................................... 464/68.6; 403/359.4
(58) Field of Classification Search
USPC ...................... 464/68.6, 77; 403/359.2, 359.4
See application file for complete search history.

(56) References Cited

U.S. PATENT DOCUMENTS

| | | | |
|---|---|---|---|
| 4,461,376 A | * | 7/1984 | Lech et al. |
| 4,473,317 A | | 9/1984 | Bolang |
| 2009/0147388 A1 | | 6/2009 | Mendoza |

FOREIGN PATENT DOCUMENTS

| | | |
|---|---|---|
| CH | 469 914 | 4/1969 |
| DE | 33 34 657 C2 | 10/1991 |
| DE | 11 2007 000 230 T5 | 2/2009 |

* cited by examiner

*Primary Examiner* — Gregory Binda
(74) *Attorney, Agent, or Firm* — Henry M. Feiereisen LLC

(57) ABSTRACT

A device for drivingly connecting a drive component and a driven component by a spline includes an inner tooth pattern disposed on one of the components and a mating outer tooth pattern disposed on the other component, wherein one of the components is constructed in two parts and comprises two tooth sections configured for rotation relative to one another, at least one preload spring for tensioning the two tooth sections with respect to each other in the circumferential direction, and means which for assembling the plug-in connection maintain the two tooth sections in mutual alignment, wherein the means are constructed such that the at least one preload spring becomes automatically effective when the drive component and the driven component are connected with an axial assembly motion.

10 Claims, 2 Drawing Sheets

DEVICE FOR A DRIVE CONNECTION

CROSS-REFERENCES TO RELATED APPLICATIONS

This application claims the priority of German Patent Application, Serial No. 10 2011 008 703.6, filed Jan. 15, 2011, pursuant to 35 U.S.C. 119(a)-(d), the content of which is incorporated herein by reference in its entirety as if fully set forth herein.

BACKGROUND OF THE INVENTION

The present invention relates to a device for providing a drive connection between a drive component and a driven component with a spline connection.

The following discussion of related art is provided to assist the reader in understanding the advantages of the invention, and is not to be construed as an admission that this related art is prior art to this invention.

One type of conventional spline connection uses an integrated spring preloaded in the circumferential direction. To facilitate assembly of this spline connection, the preload is generated only after the spline connection is established, whereby a tensioning screw is provided at an end of the shaft. However, such solution assumes that the shaft is still accessible after the plug-in connection is established.

It would therefore be desirable and advantageous to address this problem and to obviate other prior art shortcomings by providing a spline connection between a drive component and a driven component which has a robust structure and which, more particularly, facilitates assembly of the components.

SUMMARY OF THE INVENTION

According to one aspect of the present invention, a device for drivingly connecting a drive component and a driven component by a spline includes an inner tooth pattern disposed on one of the components and a mating outer tooth pattern disposed on the other component, wherein one of the components is constructed in two parts and comprises two tooth sections configured for rotation relative to one another, at least one preload spring for tensioning the two tooth sections with respect to each other in the circumferential direction, and means which for assembling the plug-in connection maintain the two tooth sections in mutual alignment, wherein the means are constructed such that the at least one preload spring becomes automatically effective when the drive component and the driven component are connected with an axial assembly motion.

The means for holdings the spline gears in common alignment are configured so that they effectively automatically apply the at least one preload spring when the spline connection is established through the axial assembly motion. This has the advantage that a tensioning screw is not required and that the plug-in connection need not be accessible from the outside after assembly, thereby making it useful, for example, also for gear connections which are not accessible because of surrounding housing parts.

According to an advantageous feature of the present invention, the means may be formed by at least one bolt which is arranged axially parallel to the tooth sections and which engages with both parts of the component, wherein the bolt comes into engagement by way of a driver with the other component during assembly of the plug-in connection and releases the connection between the two parts of the split component.

According to an advantageous feature of the present invention, several bolts may be distributed along the circumference, which are attached as drivers on an axially displaceable cup wheel which is formfittingly arranged on the divided component, wherein the cup wheel is held on one part of the component with springy compliance in the axial direction. With the uniform distribution of the bolts, the bolts can still be moved in both components without jamming even under high preload forces of the spring, until the preload spring is free and accordingly tensions the two parts with respect to one another.

According to an advantageous feature of the present invention, the cup wheel may be attached on one part of the divided component by way of radially oriented leaf springs having springy compliance in the axial direction. This provides a simple, easily manufacturable connection of the cup wheel to the one part of the split component, wherein the cup wheel is held without rattling and without play after the plug-in connection has been established.

According to an advantageous feature of the present invention, the preload spring disposed between the two parts of the component may be formed by at least one torsion spring nested in meander-shape, which allows high tensioning forces for play-free transmission of high and optionally alternating drive torques via the spline gear while having low manufacturing costs.

According to an advantageous feature of the present invention, the preload spring or torsion spring may have two radially diametrically outwardly projecting arms, which are held in corresponding recesses of a disk-shaped part of the split component, wherein a center section of the torsion spring extending transversely to the arms is held in a transverse bore of a tang of the other part projecting inwardly into the disk-shaped part. This results in an advantageous structural arrangement of the torsion spring which is integrated in the disk-shaped part.

Alternatively, in another advantageous embodiment facilitating assembly, the torsion spring may be formed by two individual springs which are each guided around the tang in opposite directions by 270°, wherein a radially outwardly projecting arm of the torsion spring is held in a corresponding recess of the other component and wherein a centripetally inwardly projecting arm of the torsion spring is held in the corresponding transverse bore of the tang.

According to an advantageous feature of the present invention, the spline gear may be arranged between the secondary part as a drive component of a torsional vibration damper of a drive connection between a driving internal combustion engine and a downstream gear-change transmission and a driven flange as the driven component driven by the drive element of the gear-change transmission. In this way, in a particularly advantageous manner facilitating assembly, the primary part and the secondary part as well as the integrated damping unit of the torsional vibration damper can be pre-installed on the internal combustion engine and drivingly connected with a drive shaft already installed in a gear housing of the gear-change transmission by flanging to the gearbox, wherein the tooth sections are automatically tensioned.

The two-part component may hereby be the driven flange which is composed of a gear disk having an outer tooth pattern and an axially adjacent flange also having an outer tooth pattern, wherein the flange has a tang projecting inwardly into the gear disk and thus supporting the torsion spring, and wherein the flange also carries the axially springily preloaded cup wheel, which cooperates by way of its ring collar with the secondary part radially outside its corresponding inner tooth pattern such that when the plug-in connection is established, the bolts disposed in the driven component or driven flange release the circumferential connection and/or unblock the gear disk.

According to another advantageous feature of the present invention, the tang of the flange may be extended through the gear disk and may be guided indirectly or directly by a rolling bearing in the other component or in the primary part of the torsional vibration damper. This additional, in particular radial guiding is required in some gearbox designs to ensure support of gear shafts or rotating masses.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
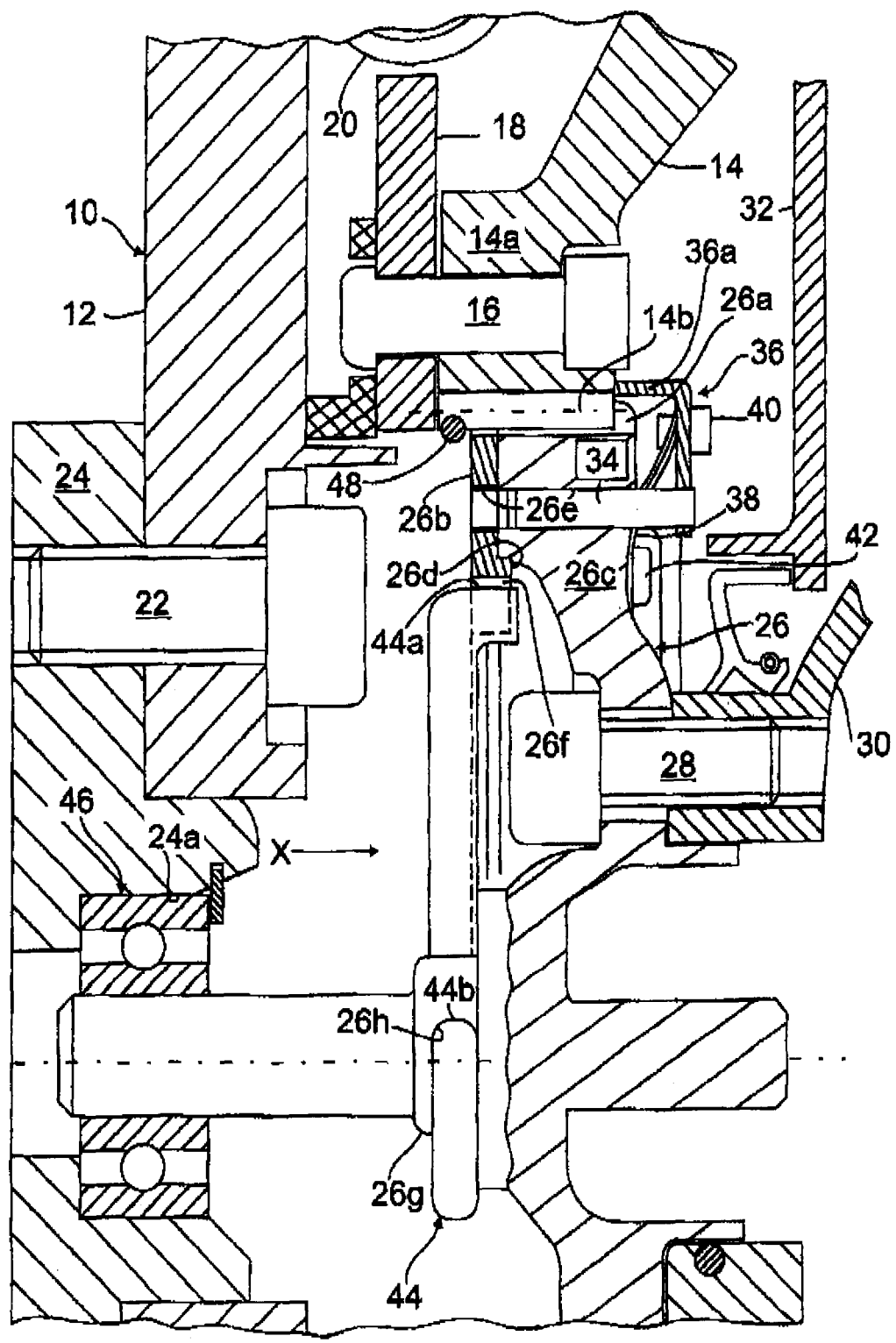
FIG. 1 shows a partial longitudinal cross-section through a drive device according to the present invention between the force output shaft of an internal combustion engine and a driven flange connected with a drive element of a speed-changing gear and an interconnected torsional vibration damper, wherein the secondary part of the torsional vibration damper is drivingly connected to the driven flange by a spline gear.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a drive device with a torsional vibration damper or a dual-mass flywheel 10, which is substantially composed of a drum-shaped primary part 12, an approximately flange-shaped secondary part 14 supported for rotation with respect to the primary part 12, a driver plate 18 connected to the secondary part 14 by screws 16, rivets and the like, and several coil compression springs 20 (only schematically shown) distributed about the circumference. The coil compression springs 20 are in torque-transmitting engagement with the primary part 12 and the driver plate 18.

It should be noted that the drive device partially illustrated in FIG. 1 is only described to the extent necessary for an understanding the present invention. The drive device can otherwise be constructed in a conventional manner.

The primary part 12 is fixedly screwed with screws 22 to the driven flange 24 of the unillustrated force output shaft or a crankshaft of the internal combustion engine and drives the secondary part 14 by the interconnected springs 20 which compensate torsional vibrations.

A hub section 14a with an inner tooth pattern 14b is formed on the secondary part 14, wherein the inner tooth pattern 14b forms in conjunction with the outer tooth pattern 26a of a driven flange 26 a plug-in connection transmitting the drive torque.

The driven flange 26 is hereby affixed with several screws 28 to an (only schematically indicated) drive element 30 which is guided out of a housing wall 32 of the unillustrated gear housing of the gear-change transmission. The torsional vibration damper 10 is hereby arranged in a gear bell housing (not shown) of the gearbox housing, which is flanged onto the housing of the internal combustion engine in a conventional manner.

The driven flange 26 is one component of the plug-in connection 14b, 26a and is formed in two parts, with a narrower ring-shaped gear disk 26b and the actual flange 26c, which are both provided with the matching outer tooth pattern 26a. The gear disk 26b protrudes with an axial extension 26d into a corresponding recess of the flange 26c and/or is guided in the recess for rotation.

Three bores (commonly designated with 26e) which are distributed about the circumference and have a common alignment are machined in the flange 26c and in the gear disk 26b, wherein bolts 34 of a defined length are inserted in the bores.

The bolts 34 are guided out of the flange 26c and attached on a cup wheel 36 by, for example, a welded connection. The cup wheel 36 is held on the flange 26c at a defined position by several leaf springs 38 distributed about the circumference, with the bolts 34 protruding into the gear disk 26b. The leaf springs 38 are attached on the cup wheel 36 by rivet joints 40 and on the flange 26c by screws 42.

Figure 2:
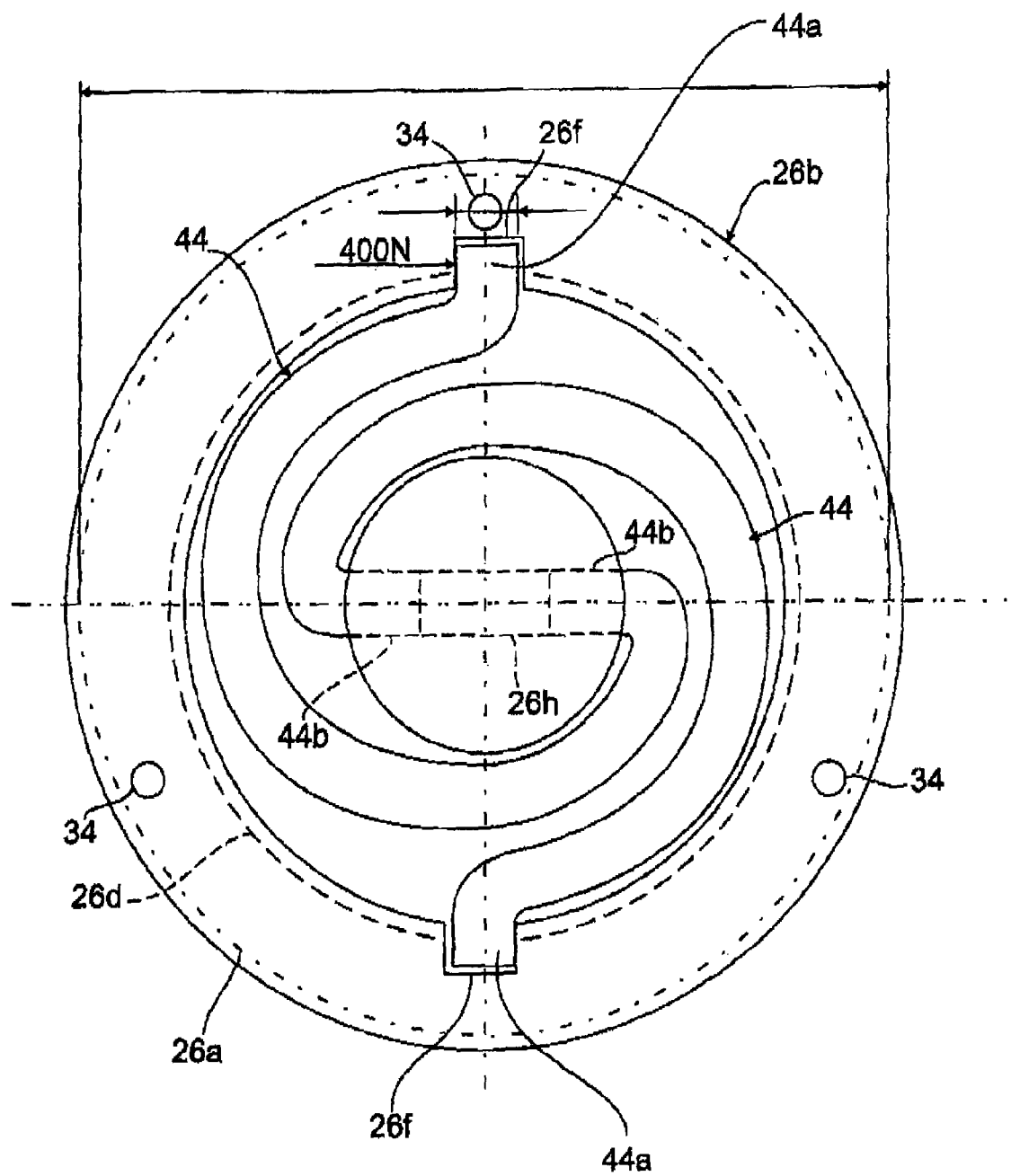
FIG. 2 shows a view X of FIG. 1 onto the gear disk of the split driven flange with two torsion springs integrated in the gear disk.

Two torsion springs 44 are inserted in the ring-shaped gear disk 26b (see also FIG. 2), wherein the torsion springs 44 protrude each with radially outwardly projecting arms 44a into corresponding diametrically opposed recesses 26f of the gear disk 26b, extend by about 270° in opposite directions around a tang 26g, and are finally inserted with their center sections 44b, which are oriented transversely and centripetally with respect to the tang 26g, in a transverse bore 26h of the tang 26g.

Overall (see FIG. 2), the torsion springs 44—which may optionally also be configured as a single torsion spring 44—are arranged in the gear disk 26b in a meander shape and apply, in the installed position and when the bolt 34 is retracted, a pretension on the gear disk 26b in the circumferential direction.

The tang 26g of the driven flange 26 is extended towards the drive flange 24 of the internal combustion engine and guided in the drive flange 24 in a rolling bearing 46 inserted in a center bore 24a.

Before the gear-change transmission is installed on the internal combustion engine, the dual-mass flywheel 10 forms an assembly unit with the internal combustion engine, whereas the driven flange 26 forms an assembly unit with the gear-change transmission. The gear disk 26b is hereby rotated with a tool (not shown) against the spring force of the torsion springs 44 into a position where the tooth patterns 26a are aligned or into a position where the bores 26e are aligned, so that the bolts 34 retract due to the axial preload force applied by the torsion springs 38 on the cup wheel 36, thus securing the tooth gear 26b with respect to the flange 26c in the circumferential direction.

If the gear-change transmission is mounted with the driven flange 26 or drivingly connected with the dual-mass flywheel 10 via the plug-in connection 26a, 14b in this pre-installation position, then the ring-shaped collar 36a of the cup wheel 36 contacts in an intermediate position—wherein the outer tooth patterns 26a of the gear disk 26b and of the flange 26c are already partially moved into the inner tooth pattern 14b of the secondary part 14—the end face of the hub section 14a of the secondary part 14 outside the inner tooth pattern 14b and causes the bolts 34 to move out of the bores 26e of the gear disk 26b when the driven flange 26 is inserted further, until the gear disk 26b can be freely rotated relative to the flange 26c (this position is illustrated in FIG. 1).

In response to the preload force of the torsion spring 44, the gear disk 26b causes tensioning of the plug-in connection 14b, 26a which eliminates any play between the tooth flanks and noise resulting therefrom. The gear disk 26b is in this end position axially secured by a circlip 48 which is pressed into the inner tooth pattern 14b of the secondary part 14.

The invention is not limited to the illustrated exemplary embodiment and can be applied particularly to those devices, where the plug-in connection is not easily accessible after assembly and/or which does not allow the use of, for example, a tensioning screw.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A device for drivingly connecting a drive component and a driven component by a spline connection, comprising:
   an inner tooth pattern disposed on one of the components and a mating outer tooth pattern disposed on the other component, wherein one of the components is constructed in two parts and comprises two tooth sections configured for rotation relative to one another,
   at least one preload spring for tensioning the two tooth sections with respect to each other in a circumferential direction, and
   alignment means for mutual alignment of the two tooth sections, wherein the alignment means are formed by at least one bolt which is arranged axially parallel to the two tooth sections and engages with both of the two parts of the one component, with the at least one bolt engaging with a driver of the other component when the drive component and the driven component are connected, thereby releasing the connection between the two parts of the one component and automatically engaging the at least one preload spring when the spline connection is connected with an assembly motion in an axial direction.

2. The device of claim 1, wherein the alignment means are formed by several bolts, which are distributed along the circumference and which are attached as drivers on an axially displaceable cup wheel which is formfittingly arranged on the one component constructed in two parts, wherein the cup wheel is held on one of the parts of the one component so as to be springily compliant in the axial direction.

3. The device of claim 2, wherein the cup wheel is attached on the one part of the one component by way of radially oriented leaf springs so as to be springily compliant in the axial direction.

4. The device of claim 1, wherein the at least one preload spring disposed between the two parts of the one component is formed by at least one torsion spring having a meander-shape.

5. The device of claim 4, wherein the at least one torsion spring comprises two radially diametrically outwardly projecting arms, which are held in corresponding recesses disposed in a disk-shaped part of the one component constructed in two parts, and wherein a center section extending transversely with respect to the outwardly projecting arms of the at least one torsion spring is held in a transverse bore of a tang that projects inwardly into the disk-shaped part of the other part of the one component.

6. The device of claim 5, wherein the at least one torsion spring is at least partially integrated in the disk-shaped part and around the tang.

7. The device of claim 4, wherein the at least one torsion spring comprises two individual springs, which each extend by approximately 270° in opposite directions around a tang, wherein a radially outwardly projecting arm of each of the two individual springs is held in a corresponding recess of the other component and wherein an inwardly projecting arm of each of the two individual springs is held in a corresponding transverse bore of the tang.

8. The device of claim 1, wherein the spline connection is arranged between the drive component constructed as an output element of a torsional vibration damper disposed between a driving internal combustion engine and a downstream gear-change transmission, and the driven component constructed as an input flange of the gear-change transmission.

9. The device of claim 8, wherein the driven flange is constructed in two parts, said driven flange comprising a gear disk having an outer tooth pattern and an axially adjacent flange having also an outer tooth pattern, wherein the axially adjacent flange has a tang protruding into the gear disk and supporting the at least one preload spring formed by at least one torsion spring, wherein the axially adjacent flange carries an axially springily preloaded cup wheel having a ring collar cooperating with a matching inner tooth pattern disposed on the drive component, such that when the connection between the drive component and the driven component is established, bolts disposed in the driven component or the input flange release the connection and unblock the gear disk.

10. The device of claim 9, wherein the tang is extended through the gear disk and is indirectly or directly guided in the driven component of the torsional vibration damper by a rolling bearing.

* * * * *